United States Patent [19]

Krieg

[11] Patent Number: 4,674,590

[45] Date of Patent: Jun. 23, 1987

[54] DRIVEN VEHICLE OF AN AUTOMATIC TRANSPORT SYSTEM

[75] Inventor: Walter Krieg, Brügg, Switzerland

[73] Assignee: Gesellschaft Fuer Roboter und Logistiktechnologie, Rolotec AG, Biel, Switzerland

[21] Appl. No.: 754,626

[22] Filed: Jul. 12, 1985

[30] Foreign Application Priority Data

Jul. 18, 1984 [CH] Switzerland ............... 3492/84

[51] Int. Cl.⁴ .................................................. B60T 7/12
[52] U.S. Cl. ................................................... 180/275
[58] Field of Search ............... 180/275, 274, 276, 277; 188/106 R; 293/5, 6

[56] References Cited

U.S. PATENT DOCUMENTS

| | | | |
|---|---|---|---|
| 3,664,701 | 5/1972 | Kondur | 180/275 |
| 3,945,672 | 3/1976 | Wong | 180/275 |
| 4,137,984 | 2/1979 | Jennings et al. | 180/274 |
| 4,363,376 | 12/1982 | Sjoberg et al. | 180/275 |
| 4,407,388 | 10/1983 | Steel | 180/275 |

Primary Examiner—Richard A. Bertsch
Attorney, Agent, or Firm—Rosen, Dainow & Jacobs

[57] ABSTRACT

To provide safe operation for unmanned operation of a guiding wire controlled vehicle also at higher speeds of about 10 km/h the vehicle comprises a contact feeler mounted on a safety cart, which contact feeler is located ahead of the face surface of the vehicle by a distance exceeding the braking distance thereof. Upon contacting an obstacle the contact feeler triggers a retracting means which retracts the safety cart against the face area of the vehicle triggering at the same time the braking operation thereof. Accordingly, the vehicle can be brought to a full stop without injuring or damaging as well as bodily contacting the obstacle.

20 Claims, 12 Drawing Figures

DRIVEN VEHICLE OF AN AUTOMATIC TRANSPORT SYSTEM

BACKGROUND OF THE INVENTION

1. Field of the Invention

The present invention relates to an improved driven vehicle of an automatic transport system, which vehicle is movable unmanned along a predetermined path. Such vehicles are known specifically for the automatic transport of workpieces in factory halls.

2. Description of the Prior Art

Such vehicles move also around halls of factories or factory buildings and generally along predetermined paths which are marked usually yellow and without any additional barriers such that in case of a collision the vehicles must brake to a stop within the safety brackets which are mounted in the direction of vehicle movement in a freely supported condition or are suspended by wires. For structural reasons these stationarily mounted safety brackets cannot exceed a predetermined length and because these brackets offer extremely insufficient safety at the inner side of curves of the path, speeds of a higher magnitude, for instance, speeds higher than 60 m/min, are impossible due to safety considerations. If the speed is to be increased in order to improve the transporting capacity such as, for instance, in freely open areas having long traveling distances, the prior art as hitherto known allows such in closed off or confined, respectively, areas only, which in practice limits the application of such transport vehicles to a great extent.

The British patent specification GB-PS No. 2 014 773 discloses an exclusively passive operating safety stopping apparatus which cooperates with insertable gripping members of a forklift. If a force acts upon the gripping members, the gripping members will be inserted, pushed inwards (against a biassing spring force) and accordingly the braking operation is triggered. Quite obviously the solution described is not suitable for protecting persons against injury in case of a collision. The same proves true for the design disclosed in the British patent specification GB-PS No. 1 430 406. The solution disclosed is a telescoping arm which projects by a larger or smaller distance in accordance with the prevailing speed. And when a force acts upon this telescoping arm, the braking is triggered. A pushing in of the arm applies thereby a moment onto a driving drum. If this moment exceeds a predetermined value, the triggering is initiated. This system comprises also no retracting mechanism which is triggered upon collisions.

SUMMARY OF THE INVENTION

It is, therefore, an object of the invention to provide an improved driven vehicle of an automatic transport system which provides also at higher traveling speeds on complete safety regarding an injury of persons and damage of objects upon a collision.

A further object is to provide an improved driven vehicle which comprises a triggering means including a contact responsive feeler means projecting from a face area of the vehicle in direction of movement thereof and extending by a distance exceeding the vehicle braking distance, which contact responsive feeler means is contact dependently retractable towards the vehicle face area by means of a retracting means with simultaneous initiation of the vehicle braking operation, whereby the driven vehicle is brought to a full stop within the above mentioned distance.

A further object is to provide a driven vehicle which includes a safety cart supporting the contact responsive feeler means, which safety cart is coupled to the vehicle face area of the vehicle by the intermediary of a variable length mounting support and is movable ahead of the vehicle relative to the direction of movement thereof and substantially along its path of movement. This provides a safe detecting of any obstacle present in the path of movement also in curvilinear sections thereof, in that the path which will be traveled through by the vehicle proper is traveled through initially by the safety cart. Preferably, the retracting means is provided with a purely mechanically triggered and acting drive such as to be independent of the supply of electrical power or pressurized air, which drive comprises specifically a set of springs which are tensioned in the operating condition.

The advantage of the improvement according to the invention is that a contact with an obstacle is utilized only for initiating the operation of the retracting means and in no case must it operate in the sense of absorbing a shock. This allows accordingly complete elimination of an influence of a force which is larger than the releasing or triggering, respectively, force of the feeler means.

BRIEF DESCRIPTION OF THE DRAWINGS

The present invention will be more fully understood by reference to the following detailed description thereof, when read in conjunction with the attached drawings, and wherein.

DESCRIPTION OF THE PREFERRED EMBODIMENT

Figure 1:
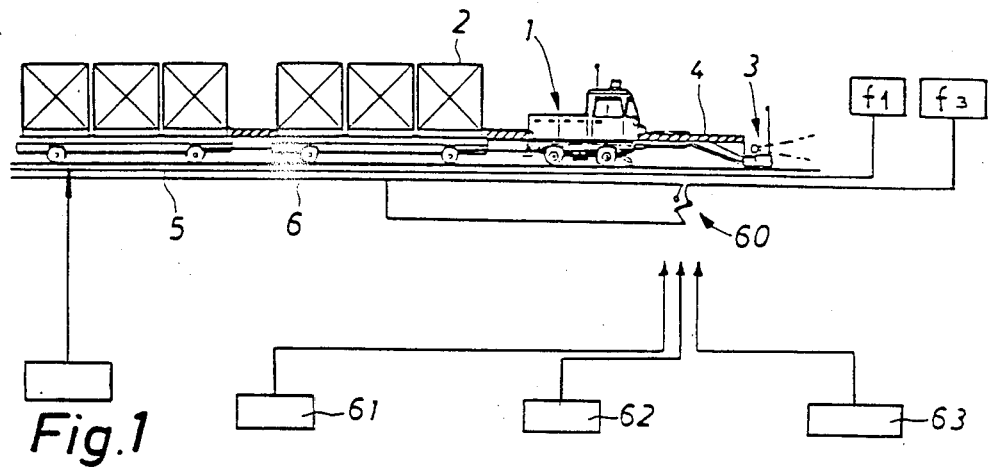
FIG. 1 illustrates a vehicle constructed in accordance with the invention drawn on a schematic basis only and in combination with a guiding wire and controlling wire system.
Figure 2:
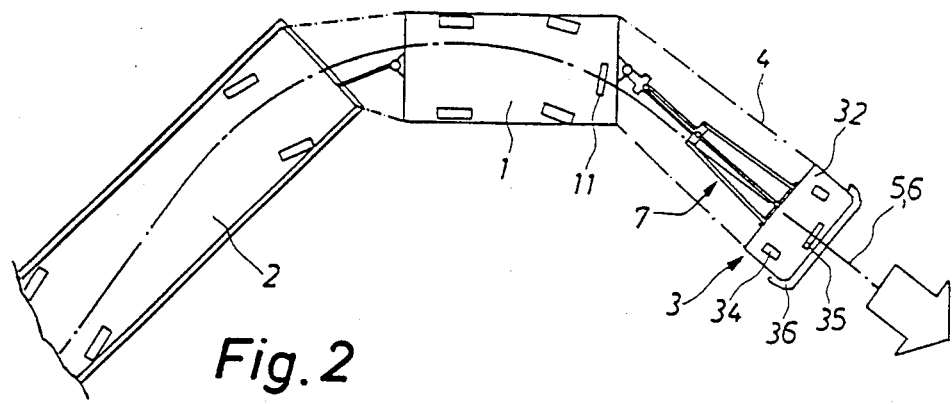
FIG. 2 illustrates a top view of the vehicle shown in FIG. 1 when traveling through a curvilinear path.
Figure 3:
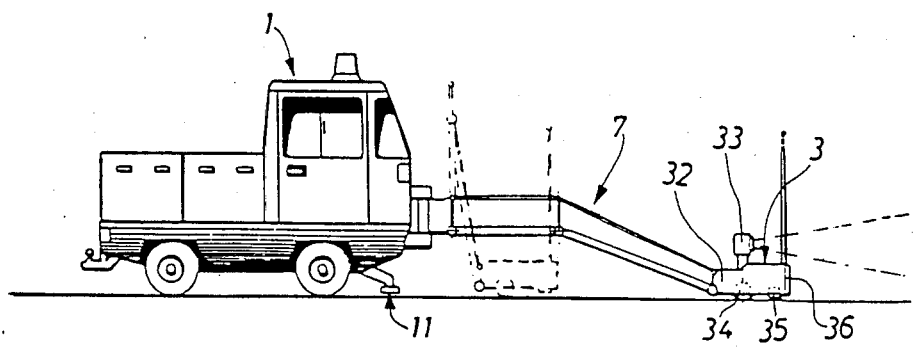
FIG. 3 illustrates a schematic side view of the feeler means in its extended as well as retractable position.

FIGS. 1 to 3 are to illustrate initially the basic structure of the claimed vehicle 1 as well as of the guiding wire control. The vehicle 1 is provided with an antenna 11 acting as receiving means, which antenna 11 is located close to the floor at the face area of the vehicle and intended to receive an alternating field of a predetermined frequency $f_1$ generated by a guiding wire 5 and to operate via an evaluating circuit a control motor of the vehicle. Conclusively, the vehicle 1 will follow the above mentioned guiding wire whereby it is also possible to provide switches such as are widely used by track bound vehicles. The movements of the vehicle are coordinated thereby by a microprocessor control. For a local orientating of the vehicle floor mounted markers (e.g. magnets of a predetermined design) are located along the path determined by the guiding wire 5, which floor markers are present at the important decision making points and can comprise, for instance, a binary code. This code can be read by the vehicle which is crossing thereover and can be evaluated by the microprocessor. The distance between mentioned floor markings is measured incrementally such that control signals for each location along the path of movement can be processed, which control signals may be permanently or ad hoc programmed, such as e.g. changes of the speed prior to curves or special functions such as blowing the horn at dangerous areas, etc. Such guiding wire control systems are generally known. They allow an automatic non-operator traffic of vehicles along the guiding wire path at work. In the present case such path system shall be intended to embrace relatively large transport distances, which extend throughout an entire factory area or plant area. In order to allow the higher traveling speeds necessary under such conditions and amounting to about 10 km/h specific safety measures must be taken, which for collisions which cannot be excluded in the generally accessible area reduce the risk of injury to persons or damage to articles and objects as much as possible. To this end and in accordance with the invention a contact responsive feeler means 36 is provided, which is mounted at the forward area of a safety cart 32, which safety cart 32 in turn is mounted to the vehicle front area by means of a retracting means 7 and it is pushed by the vehicle when traveling along its path. The contact feeler 36 projects from the vehicle face area by a distance which corresponds at least to the maximal braking distance of the vehicle at its allowed speed, i.e. by a distance of about 2.5 m for a speed of 10 km/h and which contact feeler 36 snaps back upon contacting an obstacle and simultaneously triggers or releases, respectively, the braking operation such as will be explained later on in detail by reference to FIGS. 4 and 5. The safety cart is provided in turn with an antenna 35 for the guiding wire control and comprises a correspondingly controlled pair of wheels 34. This assures that the safety cart which is being pushed sweeps the entire path of movement of the vehicle 1 and the wagon 2, respectively, such as illustrated in FIG. 2. As an additional feature a distance gauging or measuring, respectively, apparatus 33 may be mounted on the safety cart 3 which operates, for instance, on an ultrasonic basis. Such distance gauging apparatuses are generally available on the market. If this distance gauging device detects an obstacle on the path of movement, the traveling speed will be reduced by operation of the microprocessor control. Unmovably or rigidly, respectively, placed objects located along side the path of movement and which are detected by the distance gauging apparatus, such objects may be, for instance, corners of buildings present at curvilinearly extending sections of the path of movement, can be suppressed by the microprocessor control means in accordance with a respective program. The ultrasonic sound emitting and receiving heads can, furthermore, be coupled to the pair of wheels 34 such that the scanned area covers also at curvilinearly extending sections practically the entire path of movement. By means of this distance gauging or measuring, respectively, apparatus the traveling speed can be controlled in dependency on the gauged distance of the obstacle, for instance, at a distance of 10 m a reduction to 5 km/h can be made, etc., until at a distance of 2 m a complete stopping can be achieved. This permits two vehicle drawn trains to follow each other synchronously, whereby the second, i.e. following, train maintains distances from the first train in accordance with the prevailing traveling speed. Finally, there is foreseen a line safety arrangement such as illustrated in FIG. 1. To this end a control wire 6 is installed in addition to the guiding wire 5, which control wire 6 emits an electromagnetic signal having a predetermined frequency $f_3$, which is detected by a receiver of the vehicle. If this signal is not received, the vehicle is immediately brought to a stop. Obviously, this stopping occurs also at a loss of the guiding frequency $f_1$, such that the vehicle cannot travel uncontrolled. The additional control wire 6 is arranged in blocks such that emitting of the signal $f_3$ can be interrupted by a switch 60 for each block separately. This interrupting can be initiated from a plurality of stations 61–63 for safety of travel and separately for each block, which stations can be operated, for instance, by the plant fire brigade, by the guard of a front gate or at line crossings by the shunting service group, such that accordingly each vehicle can be brought to a stop locally at any section of the line. This leads also to an immediate stopping of the vehicle upon a possible breakdown of the microprocessor control of the vehicle.

Attention is now drawn to FIGS. 4 and 5, illustrating an embodiment of the retracting means 7 as well as the contact feeler 36 triggering the retracting operation. FIG. 4a illustrates initially the situation during normal operation. The retracting means 7 is provided with two folding arms 75, 76 and a joint 77, which folding arms 75, 76 can be folded together upwards under the influence of a spring set 71. In the initial position this spring set 71 is in a stressed condition and the joint 77 is blocked by a catch 74, which engages into a groove located in a joint member 72.

Figure 4D:
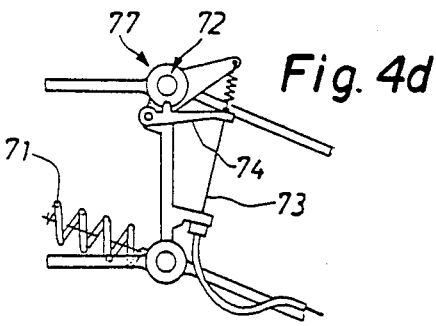
FIGS. 4a–4c illustrate the retracting operation upon contacting an obstacle and showing details of the retracting system.
Figure 4A:
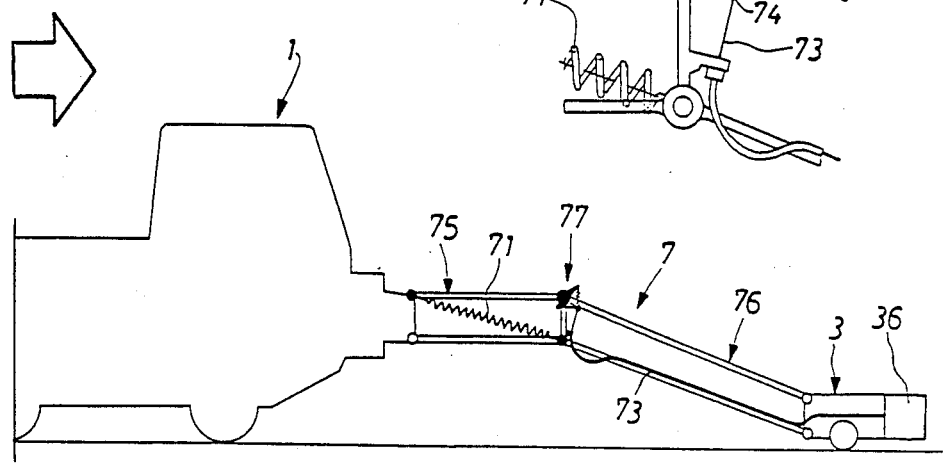
Figure 4E:
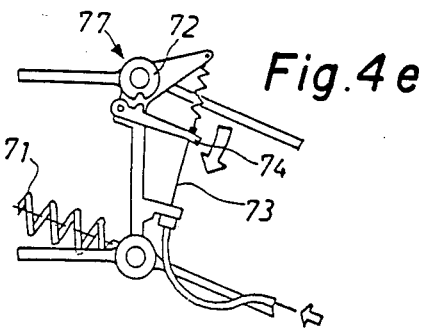
Figure 4B:
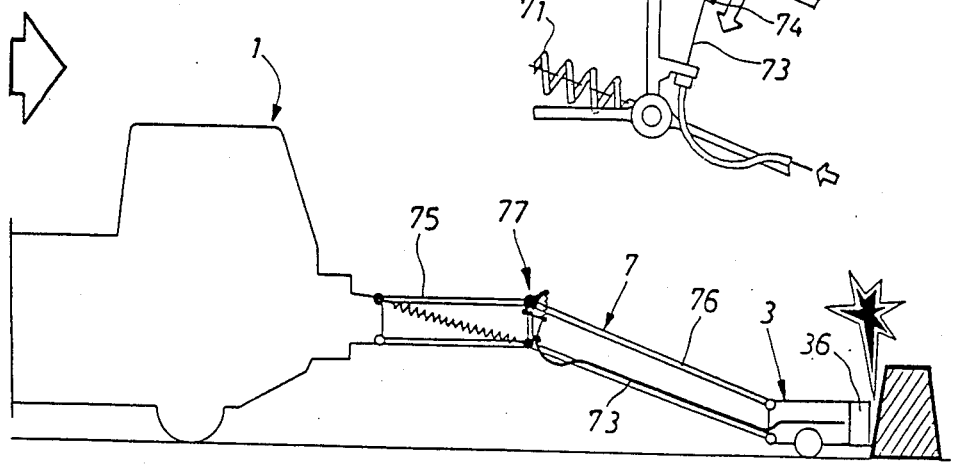
Figure 4F:
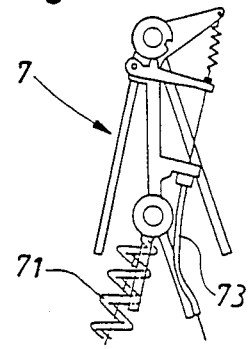
Figure 4C:
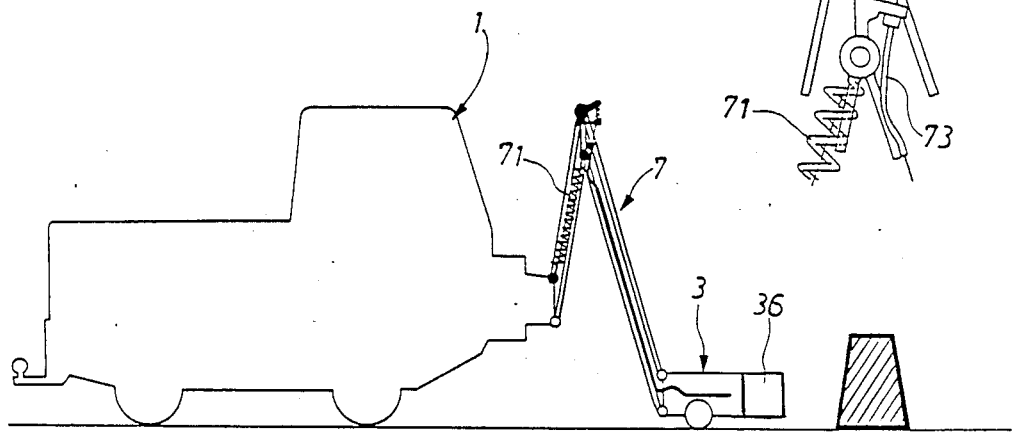
Figure 5A:
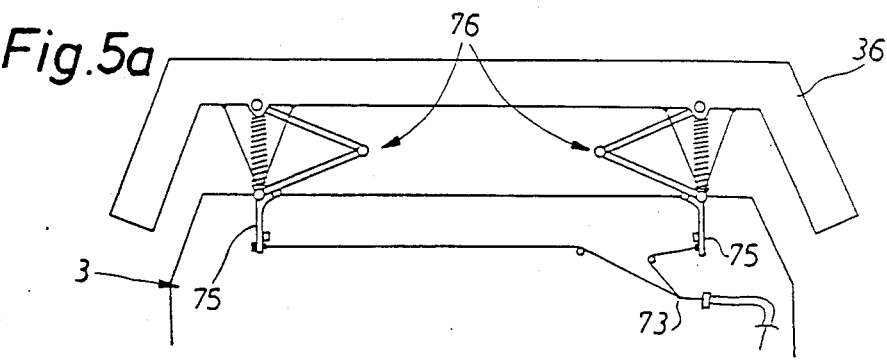
FIGS. 5a–5d illustrate a preferred embodiment of the contact responsive feeler means at various contact situations.
Figure 5B:
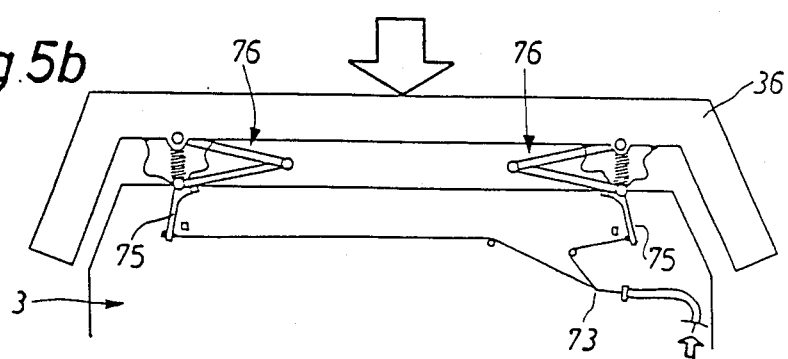
Figure 5C:
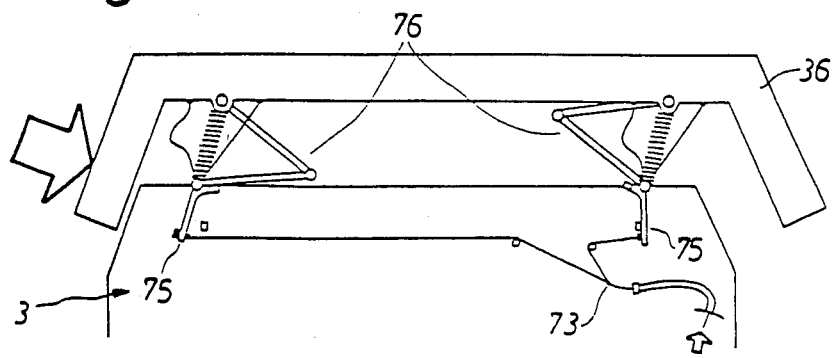
Figure 5D:
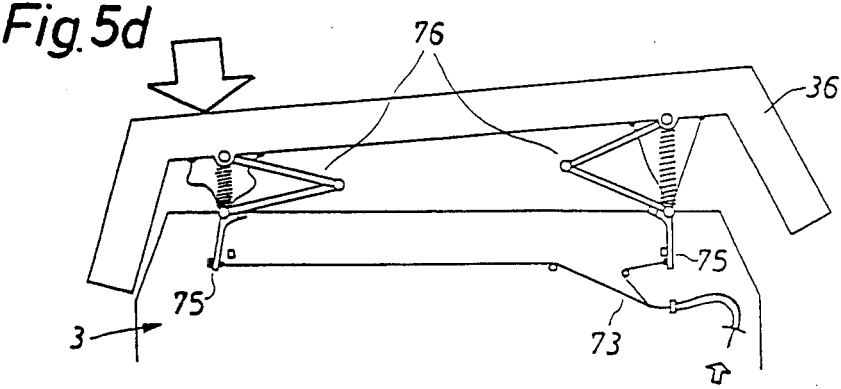

As soon as the contact feeler 36 contacts an obstacle (FIG. 4b), the catch 74 is released via a pull of the cable 73, whereupon the retracting means 7 folds in the upwards direction and pulls the safety cart 3 abruptly back towards the face area of the vehicle, whereupon the safety cart immediately comes to a standstill relative to the obstacle or retracts somewhat relative to the obstacle (FIG. 4c). At the same time the brakes are operated and the drive interrupted such that the vehicle comes to a stop at a distance from the obstacle (FIG. 4c). An exemplary embodiment of the contact feeler 36 on the safety cart is illustrated in FIGS. 5a–d. The contact feeler 36 has the shape of a bracket, which is mounted to the cart by means of an elastically yielding mounting arrangement 76. This mounting arrangement is coupled via lever arms 75 to the cable pulling device 73. If the force acts centrally upon the bracket (FIG. 5b), the mounting arrangement 76 is compressed and the cable 73 operated via both lever arms 75, which pulling of the cable operates catch 74 of the joint 77. FIGS. 5c and 5d illustrate the cases of a lateral force acting on the bracket, specifically eccentrically from the left side and from the front side, in which cases the cable 73 is operated via the corresponding lever arm 75. A corresponding operation follows from an eccentric acting of a force from the right hand side.

Figure 6:
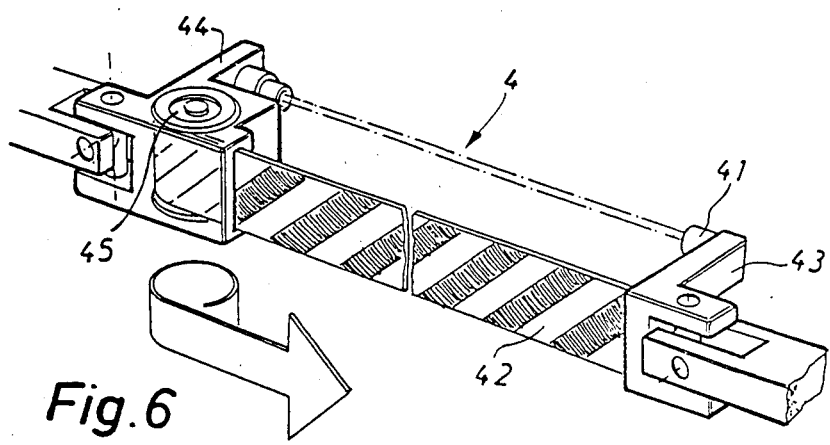
FIG. 6 illustrates a detailed view of a lateral safety means.

It must be clearly noted, that other designs of the retracting means as well as of the contact feeler are possible. The retracting means may be designed in the form of telescoping arms, which are operable under influence of springs or pressurized air. In case of pressurized air a pressure piston can maintain the retracting means in its extended position against the spring force acting thereupon, whereby a contacting of the contact feeler will open or release, respectively, a valve of the pressure piston. Such design or embodiment has the advantage, that the retracting means can be moved again to its initial operating position by the pressurized air apparatus of the vehicle. The retracting means may, furthermore, be locked for safety such that it can be triggered only if the vehicle is moving and cannot be triggered when the vehicle is at rest. In order to safeguard against an unintentional lateral penetrating of persons or objects into the space between the safety cart 3 and the face area of the vehicle a protecting means 4 including a safety web 42 is located at either side (FIGS. 1, 2 and 6), which safety web 42 is combined with a light barrier 41. The safety web 42 as well as the light barrier 41 are mounted on joint members 43, 44, which are hingedly mounted to the vehicle face area and safety cart, respectively. The joint member 44 located at the vehicle is provided furthermore with a reeling apparatus 45 for the safety web. This safety web 42 prevents stepping into the space between the safety cart and the face surface of the vehicle. If the light barrier is triggered, an emergency stop of the vehicle is initiated. Similar arrangements can be foreseen also between vehicle 1 and wagons, trailers 2 (FIG. 1).

Figure 7:
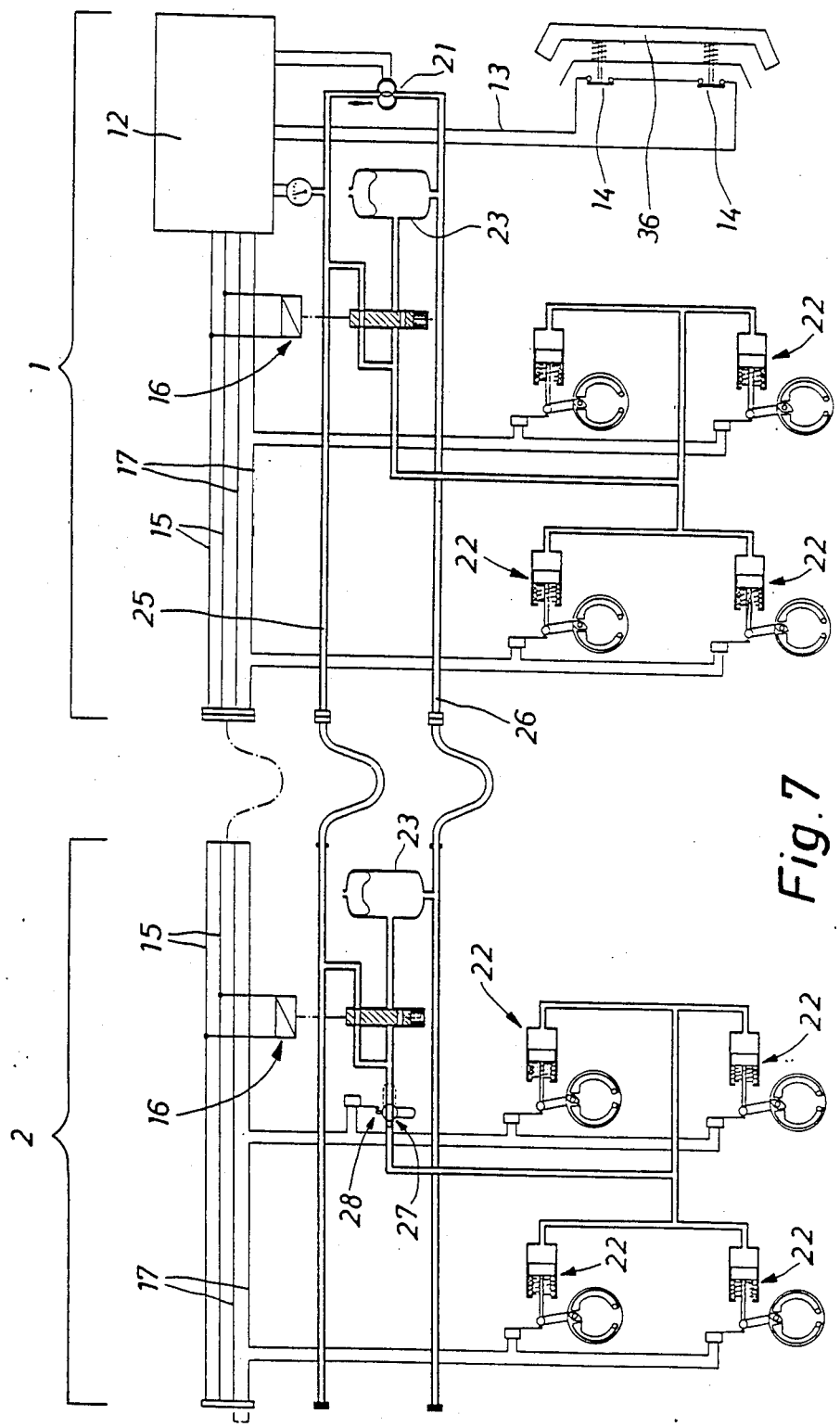
FIG. 7 illustrates schematically the braking system of driven vehicle and wagon.

It has been explained above, that the braking distance determines the longitudinal distance of the contact feeler 36 projecting from the face surface of the vehicle or the possible maximal speed thereof, respectively. Accordingly, a short as possible braking distance is sought to be achieved, which is specifically attainable by immediate operation of all brakes immediately after triggering the retracting means 7. In case of trains having wagons or trailers, respectively, also the brakes of such wagons should be operated immediately upon triggering of the retracting means. FIG. 7 illustrates schematically a preferred braking system which meets the above demands. FIG. 7 illustrates an electric control system (drawn with thin lines) as well as a pressurized air system (designed with thicker lines), which two systems extend parallel through the entire train consisting of a vehicle and at least one wagon.

The electrical control system 12 is connected via a triggering line 13 to the contact feeler 36 at the safety cart 3, which electrical system 12 is interrupted by a limit switch 14 as soon as a force acts upon the contact feeler 36. By means of the control system 12 the electrical current in the control lines 15 is also interrupted. Electrically operated valves 16 connected to the control lines 15 interconnect in their actuated position (such as illustrated in FIG. 7) a controlled pump 21 of the pressurized air braking system located in the vehicle 1 via a pressure line 25 and return flow line 26, respectively, with the individual braking devices 22, which are in their released position when pressurized. If in their rest position, the electrically operated valves 16 interconnect the braking apparatuses each with an equalizing container 23 located in a respective wagon and vehicle, whereby a sudden pressure release occurs. If now upon an emergency stop the electrical current in the control lines 15 is interrupted, the pump 21 is switched off and simultaneously all electrically operated valves 16 move into their rest position such that all braking apparatuses 22 are pressure relieved via the equalizing containers 23 and the braking operation is initiated immediately and at the same time at all locations. In order to release the brakes after such an emergency stop the electrically operated valves 16 are operated by the control system such that the braking apparatuses 22 are again connected to the pump 21 and the brakes released.

For uncoupling every wagon or trailer 2, respectively, is provided with a cock, which is brought to this end in a so-called manual position such that the braking apparatuses 22 remain pressurized. By means of limit switches 27 an auxiliary control line 17 is interrupted simultaneously which triggers via the control system 12 the same operations which occur during an emergency stop, i.e. the electrically operated valves 16 are operated into their rest position, whereupon the pressure prevailing in the pressure line 25 disappears and the wagon 2 can be uncoupled.

This braking system allows keeping of the braking distance at a minimum value because the reaction time of the brakes is negligibly short.

The described systems and apparatuses, specifically the contact feeler of the retracting system allow collectively a safe operation of the conductor-less vehicle on an area which is traveled also by other traffic. The vehicle 1 is designed, furthermore, such that it can be operated independently of the guiding wire system manually by a person, by a conductor. To this end the retracting means 7 can be folded together and up when the vehicle is driven by a person or, alternatively, could be releasably mounted to the face side of the vehicle.

While there are shown and described present preferred embodiments of the invention, it is to be distinctly understood that the invention is not limited thereto, but may be otherwise variously embodied and practiced within the scope of the following claims.

I claim:

1. A driven vehicle, said vehicle including a braking system, comprising a triggering means for initiation of a vehicle braking operation including contact responsive feeler means projecting from a face area of said vehicle in the direction of movement thereof and extending from said vehicle by a predetermined distance, said contact responsive feeler means being retractable towards said vehicle face area by retracting means at simultaneous initiation of the vehicle braking operation, whereby said driven vehicle is brought to a stop, said feeler means being operatively connected to said braking system and said retracting means.

2. The improvement of claim 1, and further comprising a safety cart supporting said feeler means, said safety cart being coupled to said vehicle face area by said retracting means and being movable ahead of said vehicle relative to the direction of movement thereof and substantially along its path of movement, said safety cart comprises a controllable pair of wheels which are controllable to steer said safety cart along a path corresponding to the path of movement of said vehicle face area.

3. The improvement of claim 2, wherein a spring loaded safety ribbon of variable length and a light barrier directed parallel thereto are arranged laterally between said safety cart and said vehicle face area and operative to trip the vehicle stopping operation upon a lateral acting of a force thereupon.

4. The improvement of claim 1, in which said retracting means comprises a set of springs which are tensioned in the operative condition, by means of which set of springs said retracting means is driveable to retract upon said contact responsive feeler means making contact.

5. The improvement of claim 1, in which said vehicle comprises a non-contact distance gauging means operative to gauge the distance to objects located in the area of a predetermined path of movement of said vehicle, whereby the traveling speed thereof is adjustable in accordance with such gauged distance, and which vehicle comprises further an apparatus operative to suppress in accordance with a program control signals stemming from permanently placed objects.

6. The improvement of claim 1 in combination with a transport system including a guiding wire control system for controlling the direction of movement of said vehicle, comprising a receiving means operative to receive electrical signals generated by a guiding wire defining the path of movement of said vehicle and an evaluating analyser circuit connected to said receiving means and operative to control a steering motor of said vehicle.

7. The improvement of claim 6, comprising further a safety cart supporting said contact responsive feeler means, which safety cart is coupled to said vehicle face area of the vehicle by the intermediary of a variable length mounting support and is movable ahead of said vehicle relative to the direction of movement thereof and substantially along its path of movement, which said safety cart is provided with a guiding wire control system for controlling the direction of movement thereof.

8. The improvement of claim 6, comprising further an emergency stopping means including a signal receiving means and a control wire arrangement mounted to extend in a plurality of blocking sections defining fashion along the path of movement of said vehicle, which signal receiving means is operative to receive a control frequency sent from said control wire arrangement, and which emergency stopping means includes further a switch for interrupting the vehicle drive upon an absence of receipt of said control frequency.

9. The improvement of claim 8, wherein said switch is operative for interrupting the vehicle drive additionally upon an absence of receipt of said electrical signals generated by said guiding wire.

10. The improvement of claim 1 in combination with at least one vehicle drawn wagon, wherein a spring loaded safety ribbon of variable length and a light barrier directed parallel thereto are arranged laterally between the vehicle rear side and said wagon and operative to trip the vehicle stopping operation upon a lateral acting of a force thereupon.

11. The improvement of claim 1 in combination with a fluid pressure braking system including wheel brakes which are released by a fluid pressure and engaged by a fluid pressure decrease, comprising an electrically operated brake pressure control means coupled such to said contact responsive feeler means or said retracting means, respectively, that upon an operation thereof said brake pressure control means initiates an immediate pressure decrease.

12. The improvement of claim 11 in combination further with a vehicle driven wagon having fluid pressure operated wheel brakes, in which said fluid pressure braking system comprises a vehicle mounted pressure generating means connected by means of pressure lines to all wheel brakes, and in which said vehicle and said wagon are provided each with a pressure reducing valve, which valves are substantially simultaneously operable by an electrical control.

13. A driven vehicle as claimed in claim 1 and further comprising means for guiding said vehicle unmanned along a predetermined path.

14. The improvement of claim 1, wherein said vehicle is provided with control elements allowing an operation thereof by a driver, and wherein said contact responsive feeler means is dismountable or foldable for such driver controlled operation.

15. A driven vehicle, said vehicle including a braking system, comprising:
feeler means projecting from a face are a of said vehicle in the direction of movement thereof, said feeler being adapted to respond to contact with an external object;
retracting means for moving said feeler means toward said vehicle in response to said contact, said feeler means being operatively connected to said retracting means;
means for actuating said braking system simultaneously with retraction of said feeler means after said contact with said external object, said driven vehicle being braked by actuation of said braking system, said means for actuating being operatively connected to said feeler means.

16. A driven vehicle as claimed in claim 15, wherein said braking system brings said vehicle to a stop in a predetermined distance from a predetermined forward velocity, said contact responsive feeler means projecting from said face area of said vehicle in the direction of movement thereof and extending from said vehicle by a distance exceeding said vehicle braking distance, actuation of said braking system bringing said driven vehicle to a stop within said distance between said vehicle and feeler means.

17. The driven vehicle as claimed in claim 15 and further comprising a safety cart supporting said feeler means, said safety cart being coupled to said face area of the vehicle by said retracting means, said safety cart including a pair of wheels controllable to steer said safety cart along a path corresponding to the path of movement of said vehicle face area.

18. The vehicle as claimed in claim 15, wherein said retracting means comprises a compressible structure and means for compressing said structure in response to said contract of said feeler means with said external object.

19. The vehicle as claimed in claim 18, wherein said means for compressing includes at least one spring, said spring being mounted in tension in the operative condition of said vehicle, means for releasing said tensioned spring, contraction of said springs upon actuation of said means for releasing compressing said structure.

20. A self guided vehicle of an automatic transport system, said vehicle having a braking means for stopping the vehicle within a predetermined maximum distance and having a safety element extending forwardly of its front end; said safety element including a wheel-supported cart with a contact responsive feeler and retracting means mounted between said front end of the vehicle and said cart; said retracting means having a first extended position defining a first interspace between said cart and said front end and a second retraction position defining a second reduced interspace between said cart and said front end; said retracting means and said braking means being operatively connected to said contact responsive feeler, and means for driving said retracting means between said first and second positions upon contact of said feeler with an object in the vehicles path of motion, said retracting menas being driven to move said safety element from said extended to said retracted position, and said braking means being actuated, the difference between said first and second interspace being at least equal to said maximum distance.

* * * * *